(12) United States Patent
Huang

(10) Patent No.: US 7,239,954 B2
(45) Date of Patent: Jul. 3, 2007

(54) METHOD FOR RAPID, STABLE TORQUE TRANSITION BETWEEN LEAN RICH COMBUSTION MODES

(75) Inventor: Yiqun Huang, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 215 days.

(21) Appl. No.: 11/182,679

(22) Filed: Jul. 15, 2005

(65) Prior Publication Data

US 2006/0064228 A1 Mar. 23, 2006

Related U.S. Application Data

(60) Provisional application No. 60/611,101, filed on Sep. 17, 2004.

(51) Int. Cl.
- B60T 7/12 (2006.01)
- G05D 1/00 (2006.01)
- G06F 7/00 (2006.01)
- G06F 17/00 (2006.01)

(52) U.S. Cl. .............. 701/103; 123/434; 123/480; 701/104

(58) Field of Classification Search .............. 701/103, 701/104, 105, 109, 114, 115; 123/434, 695, 123/480

See application file for complete search history.

(56) References Cited

U.S. PATENT DOCUMENTS 5,732,554 A 3/1998 Sasaki et al.
5,937,639 A 8/1999 Sasaki et al.
6,230,683 B1* 5/2001 zur Loye et al. ........... 123/435
6,561,158 B2* 5/2003 Yoshida et al. ............. 123/295
7,159,389 B2* 1/2007 Miura ......................... 60/295
2002/0050265 A1* 5/2002 Yoshida et al. ............. 123/295
2002/0185109 A1* 12/2002 Flynn et al. ................ 123/435
2003/0015168 A1* 1/2003 Yoshida et al. ............. 123/295
2003/0200955 A1* 10/2003 zur Loye et al. ........... 123/435
2004/0069273 A1* 4/2004 Visser et al. ........... 123/406.47

* cited by examiner

Primary Examiner—John T. Kwon
(74) Attorney, Agent, or Firm—Gunn & Lee, P.C.

(57) ABSTRACT

A method for rapidly transitioning from a lean combustion mode to a rich combustion mode, such as often required for the regeneration of aftertreatment devices, is provided by abrupt intake air reduction and a concurrent abrupt increase in fuel injection quantity with accompanying retardation of fuel injection timing. The abrupt increase in fuel quantity is to a maximum value sufficient to immediately provide a defined initial rich air/fuel ratio for a coexistent oxygen concentration in the cylinder. The fuel quantity is then proportionally reduced from the maximum value to a target fuel quantity to maintain a target air/fuel ratio during the transition. Simultaneously, injection timing is abruptly retarded to a value sufficient to avoid torque increase as a result of the increased injected fuel. The injection timing is subsequently proportionally advanced from the abruptly retarded timing value when the target fuel quantity and air/fuel ratio values are achieved.

13 Claims, 7 Drawing Sheets

METHOD FOR RAPID, STABLE TORQUE TRANSITION BETWEEN LEAN RICH COMBUSTION MODES

This is a non-provisional application claiming priority to U.S. Provisional Application Ser. No. 60/611,101 filed Sep. 17, 2004.

BACKGROUND OF THE INVENTION

1. Technical Field

This invention relates generally to a method for controlling engine transitions between lean and rich combustion modes, and more particularly to such a method for rapid air/fuel ratio control by which torque fluctuations and fuel penalties are minimized.

2. Background Art

Worldwide emissions regulations slated for introduction in the near future impose very stringent emissions regulations. The Tier 2 regulations in the United States require that Diesel vehicles have the same ultra-low emissions levels as spark ignited vehicles. Combustion mode changes, to address both in-cylinder (engine-out) and exhaust gas treatment device requirements have been proposed. For example, U.S. Pat. No. 5,732,554, issued Mar. 31, 1998 to Shizuo Sasaki, et al. for an EXHAUST GAS PURIFICATION DEVICE FOR AN INTERNAL COMBUSTION ENGINE describes a method by which the normal fuel lean operating mode of an engine is switched to a rich premixed charge compression ignition, more accurately and preferably referred to as a premixed controlled compression ignition (PCCI) combustion mode.

U.S. Pat. No. 5,937,639 granted Aug. 17, 1999 to Shizuo Sasaki, et al. for INTERNAL COMBUSTION ENGINE describes an alternative method for lowering the combustion temperature, i.e., low temperature combustion (LTC) to minimize smoke generation during rich, or near rich, combustion. LTC and PCCI combustion are alternative rich combustion modes which normal Diesel lean combustion can be transitioned to during engine operation.

Perhaps of most concern to the Diesel engine market are the proposed very tight future reductions in terms of oxides of nitrogen (NOx) and particulate matter (PM) emissions. One of the most promising technologies for NOx treatment is a NOx absorber, also known as a "lean NOx trap" (LNT). Diesel particulate filters (DPF) are the most likely, at least in the foreseeable future, means by which PM emissions can be reduced. Lean NOx traps and Diesel particulate filters need to be regenerated periodically to restore their efficiencies. The regeneration is usually done by providing reductants, such as CO and HC under oxygen-free conditions. This is typically provided by products of rich combustion within a defined temperature range.

Rich operation, i.e., a combustion mixture richer than stoichiometric, can be provided by throttling the intake air, increasing the exhaust gas recirculation (EGR) rate and varying turbocharger operation, all of which require additional fuel to provide rich operation. There are various methods for injecting the additional fuel necessary to provide rich operation and control intake throttle, exhaust gas recirculation, and turbocharger operation.

The present invention is directed to a method for fast air/fuel (A/F) ratio transitions, either from lean to rich or rich to lean, while maintaining constant torque. Also, to minimize fuel penalties, fast transition between standard Diesel lean combustion and rich combustion is desired. Heretofore, fuel used during such transitions was not useful for either NOx reduction, LTC rich combustion, or PCCI rich combustion because the required A/F ratio was not provided during the transition. The present invention is directed to overcoming the problems set forth above.

SUMMARY OF THE INVENTION

In accordance with one aspect of the present invention, a method for controlling an engine to provide stable torque during rapid air/fuel ratio transitions between a normal lean combustion mode and a temporary rich combustion mode includes determining a target A/F ratio and fuel injection timing for the desired temporary rich combustion mode, and then abruptly reducing the intake air mass flow to the relative amount of the air required at the target A/F condition. The oxygen concentration in each cylinder is determined, and simultaneously the amount of fuel injected into the cylinder is initially abruptly increased to the relative amount of fuel required to achieve the target A/F condition for the determined oxygen concentration in the cylinder, and simultaneously abruptly retarding the timing of fuel injection. Subsequently, the amount of fuel injected into the cylinder is proportionally decreased to maintain the target A/F ratio during the transition from lean combustion to rich combustion, while simultaneously proportionally advancing the timing of fuel injected into the cylinder to the determined target injection timing value.

Another feature of the present invention includes providing a rapid, smooth torque transition from a normal lean to a rich PCCI combustion mode. When operating in the rich PCCI combustion mode, fuel injection timing has a target value that is retarded from the fuel injection timing when the engine is operating in the normal lean combustion mode.

Yet another method for controlling engines, in accordance with the present invention, includes providing a rapid, smooth torque transition from a normal lean to a rich LTC mode. When operating in the rich LTC mode, fuel injection timing has a target value that is advanced from the fuel injection timing when the engine is operating in the normal lean combustion mode.

Still another feature of the present invention subsequent to the rapid transition from lean to rich combustion, includes operating the engine in the rich combustion mode for a selected length of time, after which the intake air mass flow is abruptly increased to the relative amount of air required at the normal lean combustion mode A/F ratio condition. The amount of fuel injected into the cylinder is decreased to an amount sufficient to provide the normal lean combustion mode A/F ratio for the determined $O_2$ concentration in the cylinder while simultaneously modifying the timing of the fuel injection. Subsequently, the amount of fuel injected into the cylinder is proportionally decreased to maintain the normal lean combustion mode A/F ratio during the transition from the rich combustion mode to the lean combustion mode while simultaneously continue to proportionally modifying the timing of fuel injection into the cylinder to the normal lean combustion mode injection timing value.

BRIEF DESCRIPTION OF THE DRAWINGS

A more complete understanding of the method of engine control for maintaining stable torque during a rapid air/fuel ratio transition may be had by reference to the following detailed description when taken in conjunction with the accompanying drawings, wherein.

DETAILED DESCRIPTION OF THE INVENTION

The present invention describes methods to achieve fast air/fuel (A/F) ratio transitions from lean to rich combustion and, subsequently, rich back to lean combustion while maintaining constant engine torque, or load. The fastest way to reduce air flow is to close the intake throttle completely for a very short period of time, i.e., overshoot the desired air flow for rich combustion, and reduce boost and/or increase exhaust gas recirculation (EGR) if needed, while fuel quantity and injection timing are proportionally transitioned to the target parameters. "Intake air" as used herein refers to the actual charge provided to a cylinder during the intake stroke, and may consist of one or more components including ambient air, recirculated exhaust gas, and compressed air provided by the compressor stage of a turbocharger. However, rapid throttling of the intake air charge, by itself, will not produce the desired amount of air in each cylinder to provide the target value A/F ratio during successive engine cycles following rapid throttling because flow from the intake manifold to each cylinder is a continuous flow physical phenomena. Furthermore, rapid change in intake air throttling, without changes in other operating parameters will produce highly undesirable engine torque fluctuation during a transition between combustion modes.

Figure 2:
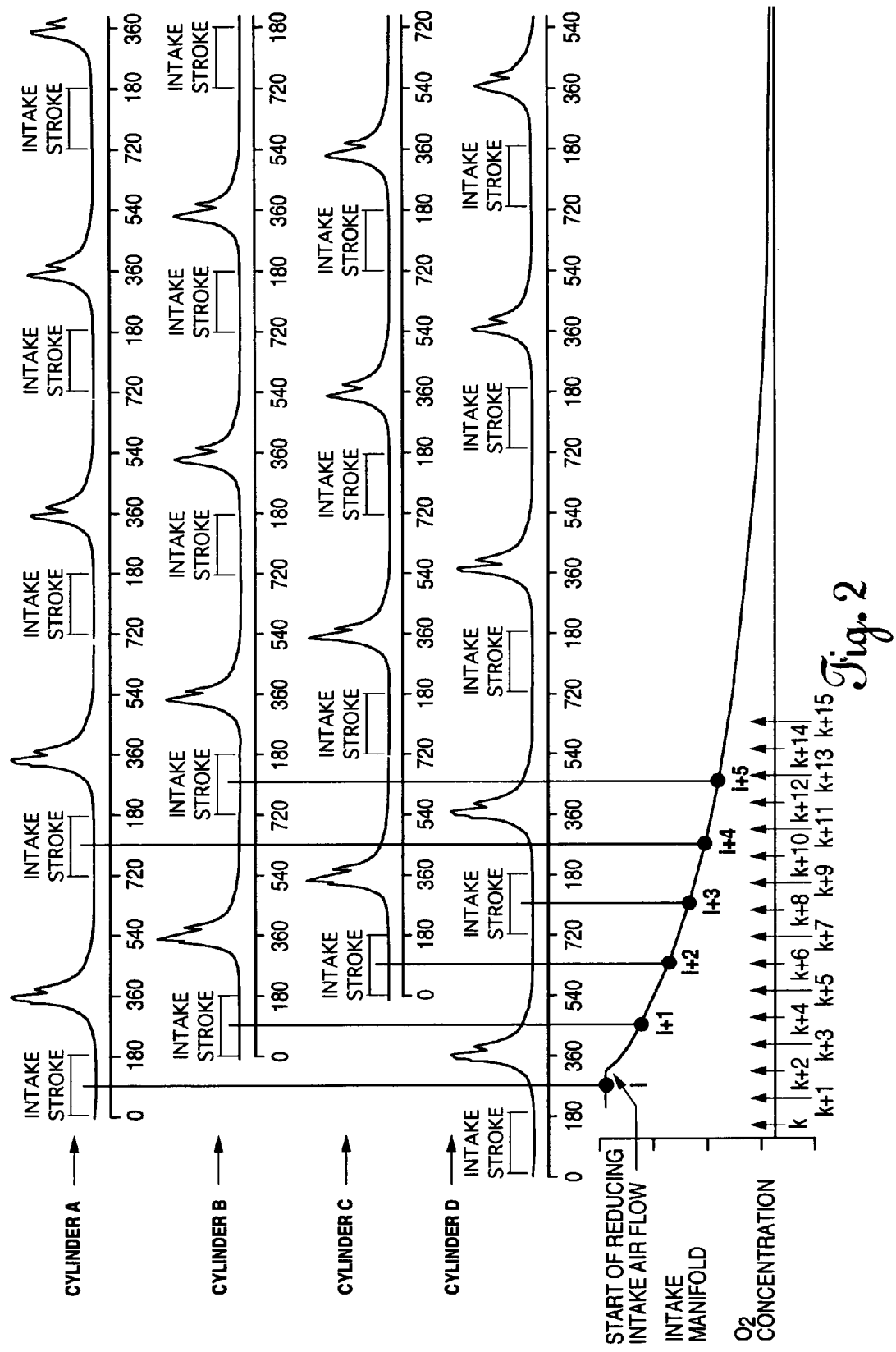
FIG. 2 is a graphical illustration of the decrease of in-cylinder oxygen concentrations among all cylinders following an abrupt intake manifold air reduction.

In a rapid intake air reduction process, the more rapid the air reduction, the greater will be the difference in the in-cylinder oxygen concentration among cylinders. This phenomenon is illustrated in FIG. 2. Before turning to a discussion of FIG. 2, it should be noted that, in the following discussion and description of the present invention, "oxygen ($O_2$) concentration" means the amount of oxygen present in the intake charge, whether it be composed entirely or a combination of ambient air, recirculated exhaust gas, and boost air.

Turning now to a discussion of FIG. 2, a four cylinder engine is represented which has a firing cylinder of cylinder A→cylinder B→cylinder C→cylinder D. k, k+1, k+2, k+3 . . . , represents the sampling point or model predicting point for intake manifold oxygen concentration, with i, i+1, i+2, i+3, . . . , representing the respective intake stroke sequences of the engine. In the FIG. 2 illustration, a command to transition from lean to rich combustion is given at time k+2. The intake manifold $O_2$ concentration begins to decrease by intake throttling, boost reduction, increase in EGR rate, or late opening and early closing of one or more engine valves if equipped with a variable valve actuation system, or combination of one or more intake air flow reduction methods.

Prior to time k+2, assuming that the engine is operating under steady state normal Diesel lean combustion operating conditions, the $O_2$ concentration of each cylinder is the same ($O_2\_i$). The oxygen concentration at time k, k+1, and k+2 are the same as $O_2\_i$. At time k+2, cylinder A is at the intake stroke, cylinder D has already filled with the intake charge of oxygen concentration $O_2\_i$ and cylinder A is being filled with the intake charge oxygen concentration $O_2\_i$ In accordance with the present invention, the fueling command, i.e., injected fuel mass and timing, for cylinder A is the same as for cylinder D, both having oxygen concentration of $O_2\_i$, even though at the time of fuel injection, the intake manifold $O_2$ concentration has been reduced to $O_2\_k+5$. The intake manifold, or intake charge, oxygen concentration $O_2\_i$ may be readily measured by one or more sensors that measure intake airflow and/or EGR flow and/or exhaust gas properties. In-cylinder oxygen concentrations can also be readily determined by model-based calculations such are described in U.S. Patent Publication No. US 2004/0107946 published on Jun. 10, 2004.

The oxygen concentration in the intake manifold at time k+3, $O_2\_k+3$, is less than $O_2\_k+2$, at time k+2. In accordance with the present invention the fueling command for cylinder D is issued based on the oxygen concentration $O_2\_i$, the oxygen concentration of the intake charge in cylinder D before fuel injection.

Similarly, in accordance with the present invention, at time k+5, the timing command for fuel injection into cylinder A, the fueling command is issued based on the actual oxygen concentration $O_2\_i$, the actual oxygen concentration inside cylinder A before fuel injection.

Similarly, at time k+7, the timing command for fuel injection to cylinder B, the oxygen concentration in the intake manifold has been reduced to $O_2\_k+7$($O_2\_k+7 < O_2\_k+6 < O_2\_k+5 < O_2\_k+4 < O_2\_k+3 < O_2\_k+2 < O_2\_k+1 < O_2\_k$), and in accordance with the present invention, the fueling command for cylinder B is issued based on the actual oxygen concentration $O_2\_i+1$, the oxygen concentration in the intake manifold during the intake stroke of cylinder B.

Similarly, at the moment of fuel injection into cylinder C (k+10), the oxygen concentration in the intake manifold has been reduced to $O_2\_i+3$, but in accordance with the present invention, the fueling command for cylinder C is based on the determined oxygen concentration $O_2\_i+2$, the oxygen concentration in the intake cylinder during the intake stroke of cylinder C. Likewise, at the moment of fuel injection into cylinder D at k+12, the actual oxygen concentration in the intake manifold has been reduced to $O_2\_i4$, but in accordance with the present invention, the fueling command for cylinder D is issued based on the determined oxygen concentration $O_2\_i+3$, the oxygen concentration in the intake manifold during the previous intake stroke of cylinder D.

As illustrated in FIG. 2, it can be seen that the oxygen concentration in each cylinder is not constant during a rapid lean to rich combustion transition. As discussed earlier, the more rapid the air reduction, the greater will be the difference in the in-cylinder oxygen concentration among cylinders. For that reason, the present invention individually calculates the fueling command (injection timing, fuel quantity or duration, and fuel injection pressure) based on the determined, i.e., actual sensed, calculated, or modeled, individual cylinder intake charge condition at the time of the intake stroke. Thus, extra transition time and engine torque fluctuations due to the practice, heretofore, of issuing the fueling command based on the oxygen concentration in the intake manifold at the time of fuel injection, is avoided. Significantly, the present invention determines the fueling command based on each individual cylinder oxygen concentration, which will be further illustrated with reference to FIGS. 3-6.

Figure 3:
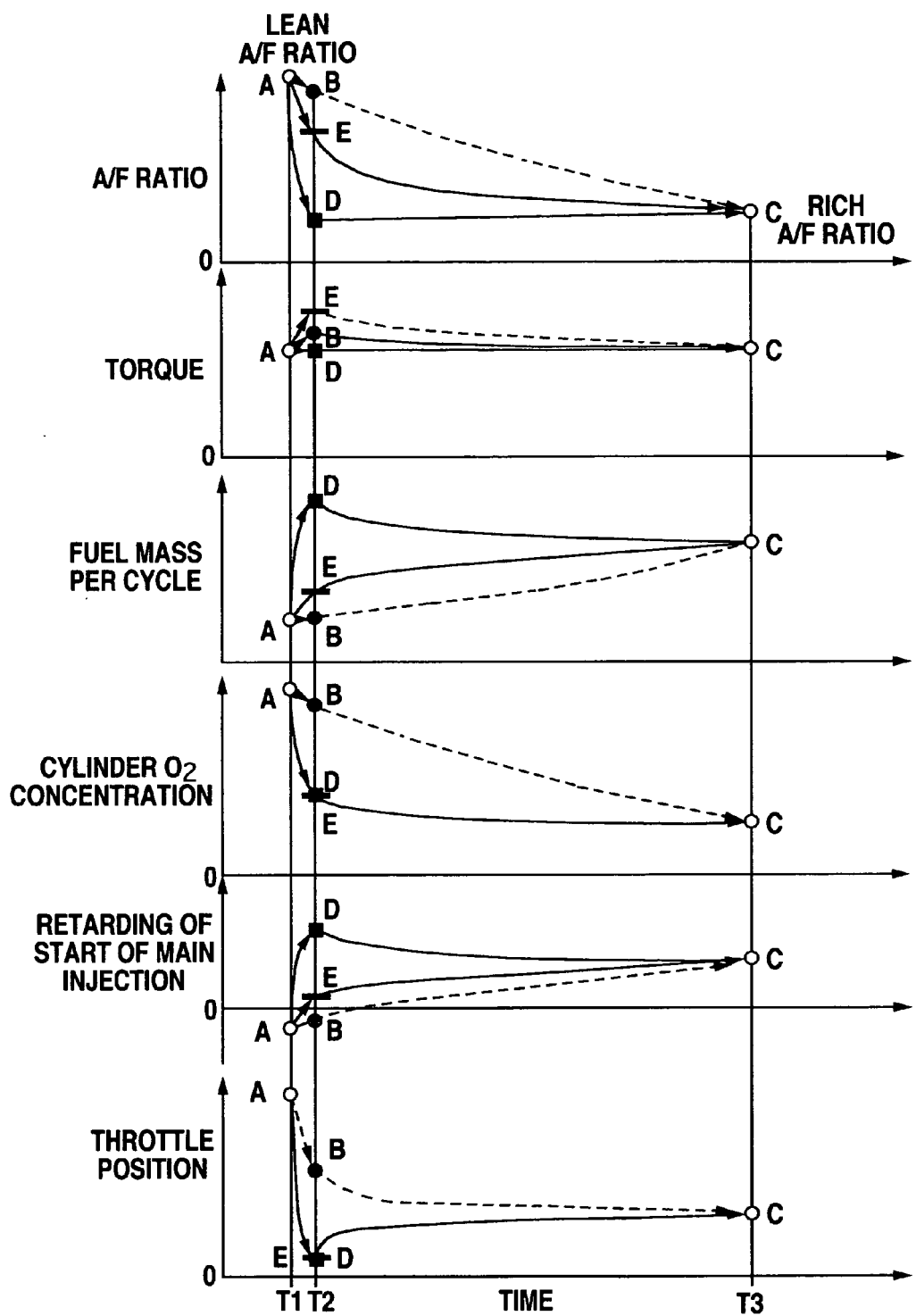
FIG. 3 is a graphic illustration of the management of fuel quantity and injection timing for fast lean to rich PCCI combustion transition using intake throttling as an example of fast intake air adjustment, in accordance with the present invention.

In FIG. 3, for the purpose of illustrating the present invention, three strategies for managing intake throttling, fuel quantity and injection timing transition from lean to rich premixed controlled compression ignition (PCCI) combustion, are presented. PCCI combustion generally consists of one or more pilot injections that provide the premixed charge portion of the total (pilot and main) fuel charge. In the following discussion, "fuel injection" refers only to the main fuel injection event. Two previously used strategies are identified as processes A-B-C and A-E-C. The process labeled A-D-C illustrates the method embodying the present invention by which stable engine torque is maintained during rapid transition between lean and rich combustion. A, B, C, D, and E represent states of the transition process. State A at time T1 represents the starting state which is lean in A/F ratio, and state C at time T3 represents the target state which has a rich A/F ratio. All three processes have the goal of transitioning from state A to state C. Time T2 represents the moment immediately after the transition command is issued. The parameters at time T2 characterize the different transition strategies. In the method embodying the present invention time T2 represents the initial rich combustion target values in the transition from lean to rich combustion, and the initial lean combustion target values in the transition from rich to lean combustion.

Process A-B-C is represented by dash lines in FIG. 3 and represents a gradual, transition between lean and rich combustion. Process A-B-C is the slowest process. At T2, the throttle is moderately closed to reduce air flow. The in-cylinder oxygen level is thereby gradually reduced, and fuel quantity is gradually increased. Also, injection timing is gradually retarded toward the target T3 value. These gradual changes result in a gradual decrease (lean to rich) in A/F ratio progressively toward the target state C rich A/F ratio at time T3. As can be seen, torque cannot be kept constant even though fuel quantity and injection timing are changed smoothly due to the fueling command not being matched with individual cylinder oxygen concentrations.

Process A-E-C is a faster process than process A-B-C. At time T2, the throttle is rapidly closed to a very low level to achieve the fastest possible reduction in air flow to provide the in-cylinder oxygen concentration required at state C. Fuel quantity is increased and injection timing retarded in a gradual transition to the desired values at state C, resulting in a faster increase in A/F ratio toward the target rich state C A/F fuel ratio at time T3. In process A-E-C torque fluctuation during the transition is high due to the relatively fast increase in fuel quantity which results in increased torque if not matched with the in-cylinder oxygen concentration, which has not yet been sufficiently reduced.

The present invention is represented by process A-D-C and is the fastest process to reduce A/F ratio compared with processes A-B-C and A-E-C. At time T2, the throttle is rapidly closed to a very low level (as in process A-E-C) to achieve the fastest possible reduction in air flow to achieve the in-cylinder oxygen concentration at state C. The in-cylinder oxygen level is rapidly reduced. However, in process A-D-C at time T2, fuel quantity (fuel mass per cycle) is jumped, i.e., abruptly raised as quickly as possible, to a maximum value that will immediately provide the initial rich target A/F ratio for the coexisting oxygen concentration in the cylinder. Simultaneously, injection timing is abruptly retarded to avoid torque fluctuations. After abruptly retarding injection timing concurrently with abruptly increasing fuel quantity, the fuel quantity is gradually reduced from the maximum value and the injection timing is gradually advanced from the most retarded state to maintain the target state C A/F ratio during the transition from state D to state C. Accordingly, the method A-D-C embodying the present invention provides the fastest lean to rich A/F fuel transition while avoiding torque fluctuations by maintaining a stable torque during the transition from a lean to rich PCCI type combustion.

Figure 4:
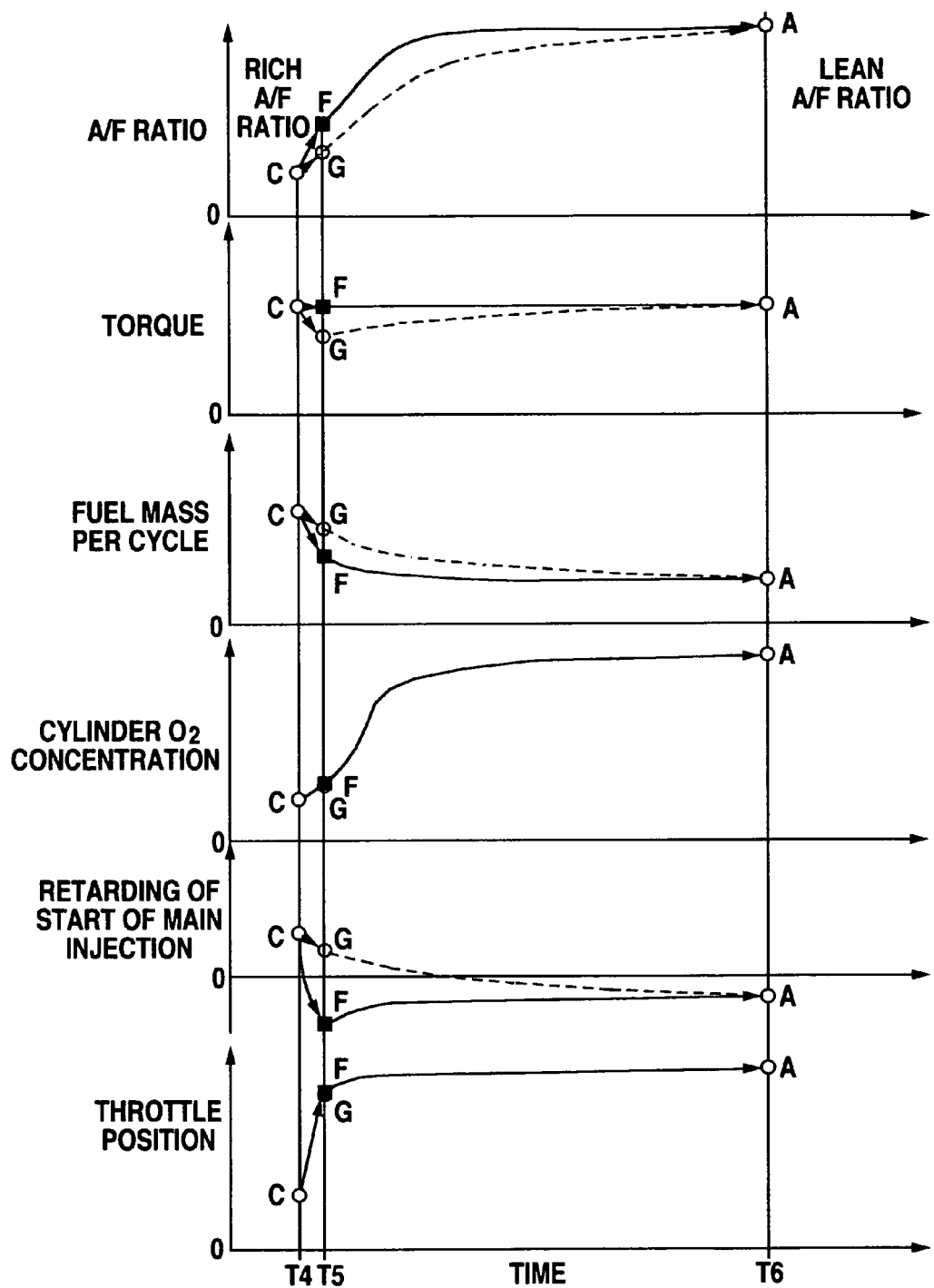
FIG. 4 is a graphic illustration of the management of fuel quantity and injection timing for fast rich PCCI to lean combustion transition using abrupt intake throttling as an example of fast intake air adjustment, in accordance with the present invention.

FIG. 4 graphically illustrates a gradual transition and the present invention strategies for managing fuel quantity and injection timing during PCCI rich combustion back to the earlier lean combustion mode. Process C-G-A, represents a gradual transition strategy, and process C-F-A, represents the present invention. Both have the same intake throttling control, i.e., open the throttle and increase air flow as fast as possible to achieve fast rich to lean A/F ratio transition. Thus, the increase of in-cylinder oxygen concentration is the same for both processes.

However, in process C-G-A, initial torque fluctuation during the transition is high due to decreased fuel quantity and retarded injection timing while the oxygen concentration in some cylinders will not have increased to the initial lean combustion concentration.

In process C-F-A, illustrating the present invention, fast A/F transition is achieved while maintaining stable torque values throughout the transition. Injection timing is abruptly advanced to an initial lean target value and then proportionally retarded to the lean state A value. The initial advance in injection timing allows significant, rapid, fuel reduction while maintaining stable torque during the transition. Fast reduction in fuel quantity during rich to lean transition reduces the overall fuel penalty normally associated with combustion mode transitions.

Figure 5:
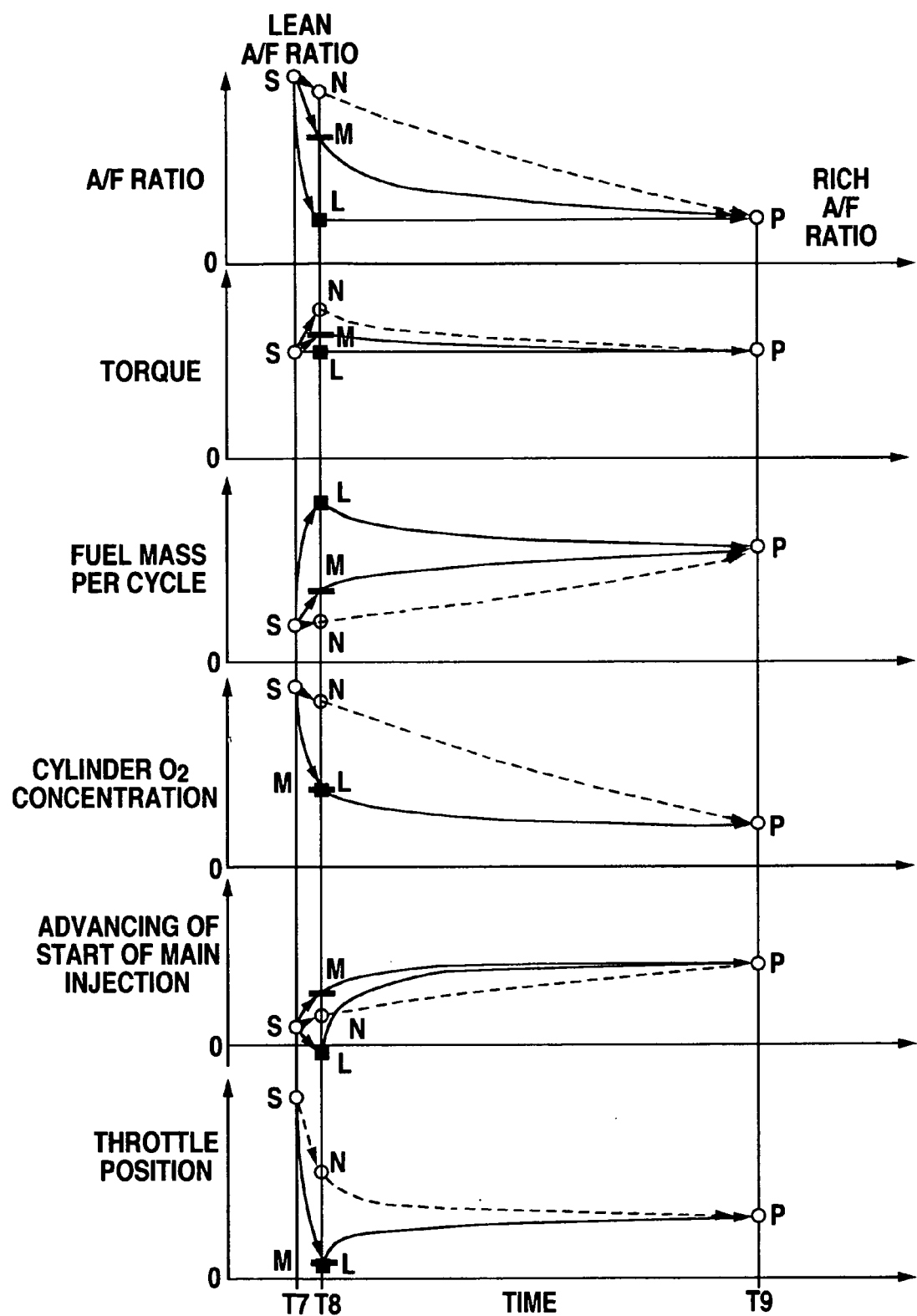
FIG. 5 is a graphic illustration of the management of fuel quantity and injection timing for fast lean to rich LTC type combustion transition using intake air throttling as an example of fast intake air adjustment, in accordance with the present invention.
Figure 6:
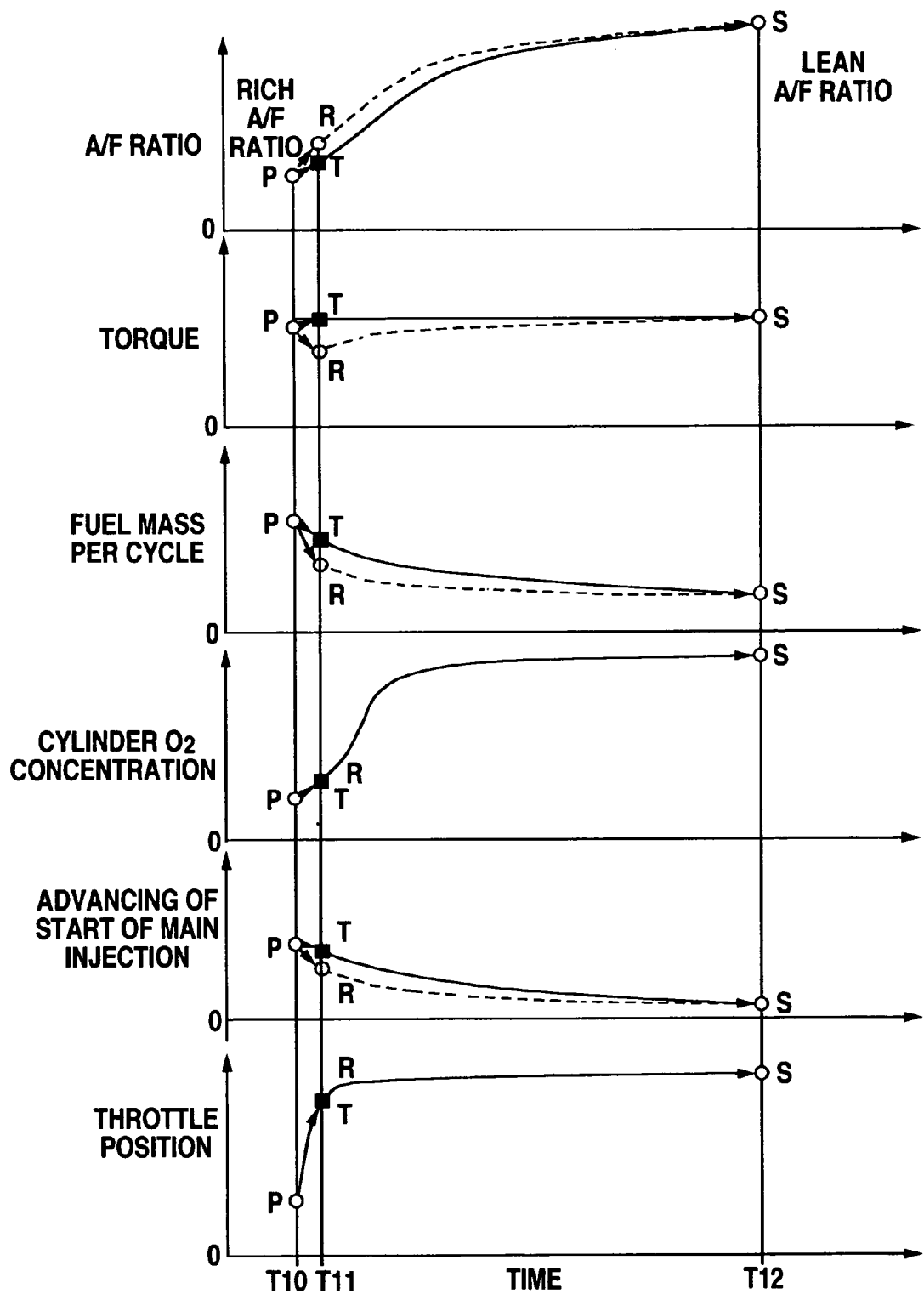
FIG. 6 is a graphic illustration of the management of fuel quantity and injection timing for fast rich LTC to lean combustion transition using abrupt intake air throttling as an example of fast intake air adjustment, in accordance with the present invention.

In FIG. 5, three strategies for the management of fuel quantity and injection timing for fast lean (standard Diesel) to rich low temperature combustion (LTC) transitions are illustrated. LTC mode operation generally consists of a single, or several smaller multiple, early injections. As used above with respect to PCCI combustion, the term "fuel injection" used with in reference to LTC mode operation refers only to the main injection event. Two of the strategies in FIG. 5 are represented by processes S-M-P and S-N-P. The method embodying the present invention for fast lean to rich LTC air/fuel ratio transition is illustrated by processes S-L-P. It should be noted that in FIGS. 5 and 6 the graphical representation of "start of main injection" is inverted from the representations shown in the above-described FIGS. 3 and 4. In FIGS. 3 and 4, advanced injection timing is illustrated as being below the zero (TDC) horizontal axis and retarded timing shown above the axis. In FIGS. 5 and 6, retarded start of main injection values are shown below the zero axis, and advanced timing values represented above the axis. The displayed start of main injection values are typical relative values used herein for the purpose of illustration. In actual practice, the zero axis (TDC position) may shift upwardly or downwardly.

In FIG. 5, state S at time T7 represents the starting state, which has a lean A/F ratio, and state P at time T9 represents the target state, which has a rich LTC air/fuel ratio. It has been found that rich premixed controlled compression ignition (PCCI) combustion is particularly desirable when the engine is operating in the medium to high load range, whereas low temperature combustion (LTC) is desirable in a relatively low load operating range. The respective ranges for PCCI and LTC type combustion can be provided by an engine map of engine speed vs. load (torque), derived experimentally, empirically, or by modeling. In the previously discussed FIG. 3 embodiment, the goal was to change the lean A/F ratio from standard Diesel lean combustion to a rich PCCI combustion as fast as possible while maintaining a constant torque value. In the FIG. 5 process, the goal is to change the A/F fuel ratio from standard Diesel lean combustion to a rich LTC air/fuel ratio as fast as possible while maintaining stable torque.

In FIG. 5, time T8 represents the moment immediately after the transition command for the transition to rich combustion is issued, i.e., the initial rich target values. The parameters at time T8 characterize the different transition strategies. Process S-N-P, a gradual transition, is the slowest process. At time T8, the throttle is moderately closed to reduce air flow. The in-cylinder oxygen level is gradually reduced and fuel quantity is gradually increased along with a gradual advance in injection timing. This process results in a gradual decrease in A/F ratio toward the target rich A/F ratio at state P. However, engine torque cannot be kept constant even if fuel quantity and injection timing are changed smoothly because individual cylinder oxygen concentrations are different, as discussed with reference to FIG. 2.

Due to rapid air reduction process S-M-P is a faster process than process S-N-P. At time T8, the throttle is rapidly, i.e., abruptly, closed to a very low level to immediately provide the in-cylinder oxygen concentration required at state P and thereby achieve the fastest possible reduction in air flow. Fuel quantity is increased and injection timing advanced in a continuous smooth transition to the desired values at state P. This results in a faster decrease in A/F ratio toward the target rich A/F ratio at state P. However, initial torque fluctuation during the transition is high because the fast increase in fuel quantity will increase torque if the in-cylinder oxygen concentration has not yet been reduced to the oxygen concentration required at state P.

Process S-L-P, representing the present invention, is the fastest process to reduce A/F ratio, compared with processes S-N-P and S-M-P. At time T8, the throttle is rapidly closed to a very low level to achieve the fastest possible reduction in air flow to reach the in-cylinder oxygen concentration at state P. The in-cylinder oxygen level is rapidly reduced, as in process S-M-P. However, in process S-L-P, fuel quantity is abruptly increased to a maximum value to immediately achieve the initial rich target air/fuel ratio, and injection timing is abruptly retarded to a maximum initial rich target value at which torque fluctuations are avoided. After the abrupt jump retarded injection timing associated with the abrupt increase in fuel quantity, the fuel quantity is gradually reduced and the retarded injection timing is gradually advanced, both to maintain the desired target values at state P throughout the remaining portion of the transition. Process S-L-P achieves the fastest lean to rich A/F ratio transition from lean to LTC type combustion while keeping torque stable.

Two strategies for managing fuel quantity and injection timing to achieve fast rich LTC type combustion to lean A/F ratio combustion are illustrated in FIG. 6. Process P-R-S represents a smooth gradual transition from rich to lean combustion values. The present invention is represented by process P-T-S. Process P-R-S and process P-T-S have the same intake throttling control, i.e., open as fast as possible to achieve fast rich to lean A/F ratio transition. Thus, the increase in in-cylinder oxygen concentration is the same for both processes. In process P-R-S, fuel quantity and the previously advanced injection timing is gradually proportionally retarded to the initial lean operation state S values. Initial torque fluctuation during the transition is high due to the decrease in fuel quantity and the retarding of fuel injection timing while the in-cylinder oxygen concentration of at least some cylinders has not increased to the intake manifold value.

In process P-T-S, representing the rich LTC type combustion to lean combustion transition embodying the present invention, both injection timing retardation and the decrease in fuel quantity during the transition are slowed down from process P-R-S, representing a gradual transition, and matched to individual cylinder oxygen concentrations during the transition. In a similar manner, the timing of the start of the main injection is gradually retarded from the advanced timing at state P at a rate that will maintain a constant torque value during the transition.

Figure 1A:
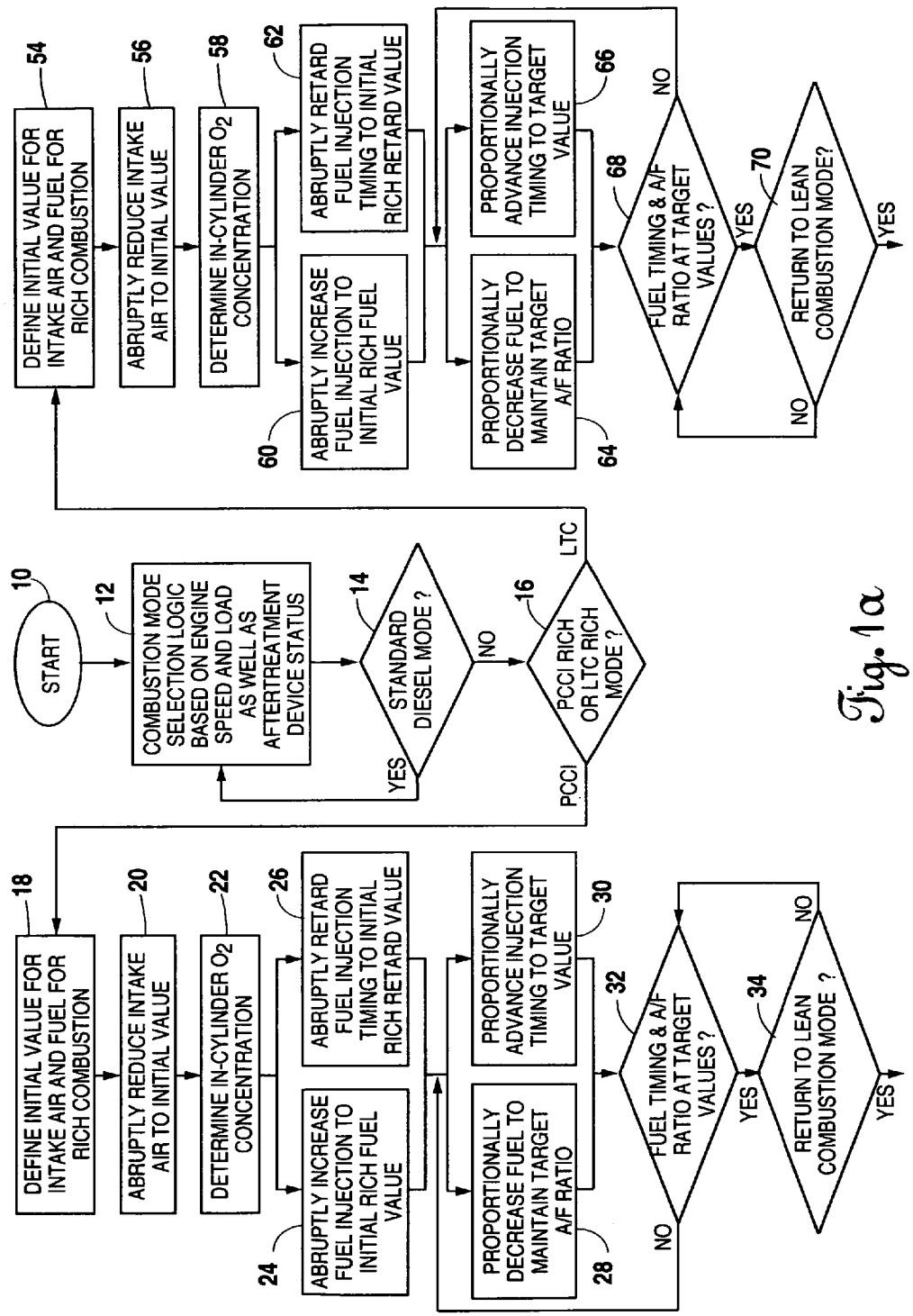
FIGS. 1(a and b) is a schematic diagram of the method for controlling an engine during transition between lean and rich combustion modes, in accordance with the present invention.
Figure 1B:
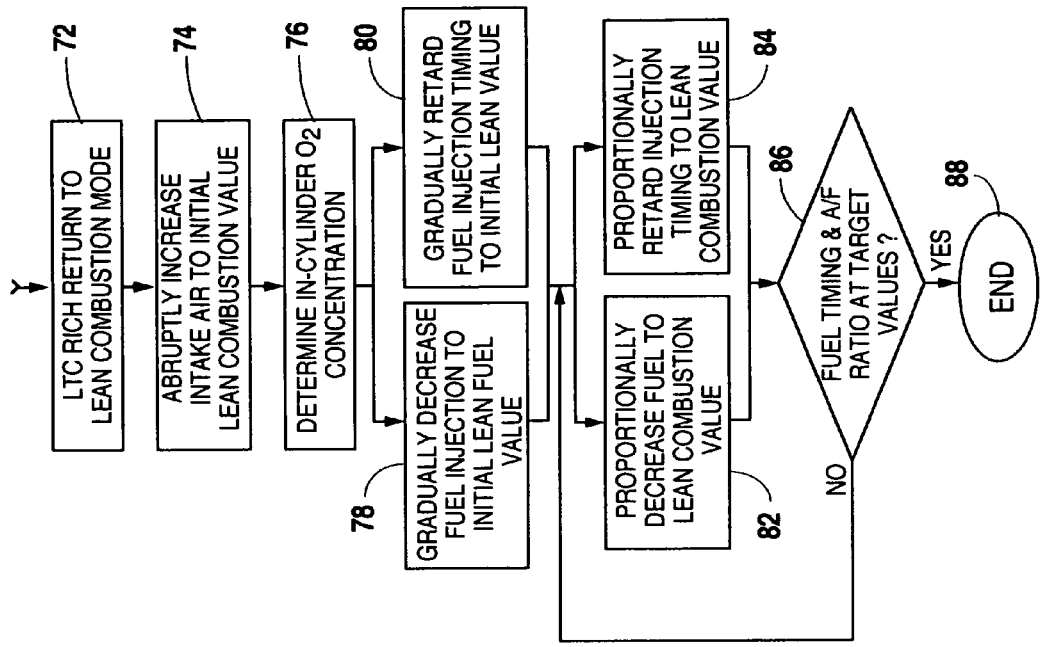
Figure 1B:
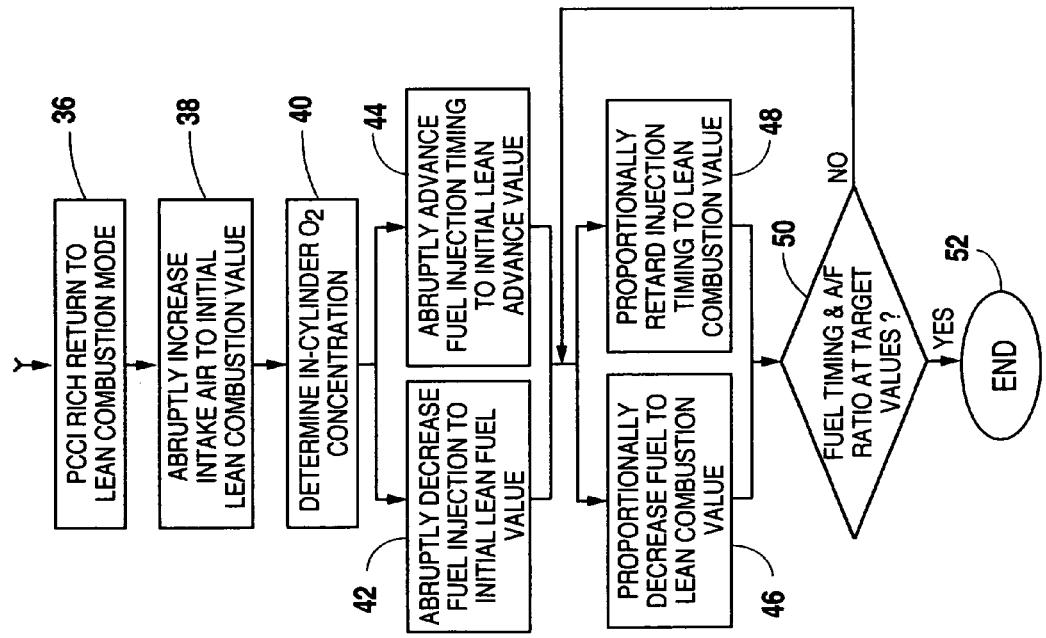

The above-described fuel quantity and fuel injection timing strategies embodying the present invention are illustrated in FIGS. 1a and 1b. The combustion mode transition process embodying the present invention begins at start block 10. The combustion mode requirements, based on engine speed, engine load, and aftertreatment device status are identified as represented at block 12. No action is taken unless a combustion mode transition is required as indicated at decision block 14. At decision block 16, a decision is made as to which temporary rich combustion mode is best suited to engine speed, load, and aftertreatment device requirements.

If a rich premixed controlled compression ignition combustion mode is selected, the initial PCCI rich combustion values for intake air and fuel are determined at block 18.

The intake air is abruptly reduced to a selected initial rich combustion value, represented at block 20, and in-cylinder $O_2$ concentration is determined as indicated at block 22. As described above, abruptly reducing intake air, for the purpose of rapidly reducing the in-cylinder oxygen concentration, can be provided by abruptly closing the intake throttle, abruptly reducing boost air from the turbocharger, and/or increasing exhaust gas recirculation rate, if used. The actual in-cylinder oxygen concentration is determined by one or more of the methods discussed above.

As illustrated above in FIG. 3, the mass of fuel injected is abruptly increased as indicated at block 24, to the determined initial PCCI target fuel value based on the current in-cylinder oxygen concentration in the cylinder. Simultaneously with abruptly increasing injected fuel mass, the injection timing is also abruptly retarded to an initial PCCI rich target value that will not cause torque to increase for the maximum fuel injected, as indicated at block 26. Fuel quantity is then reduced proportionally to maintain the target A/F ratio during the transition to the final target fuel quantity as indicated at block 28. Simultaneously with proportionally decreasing the fuel to the target A/F ratio, injection timing is proportionally advanced to the desired target timing value, as indicated at block 30.

When the current operating fuel mass flow, injection timing and A/F ratio values are at the desired rich PCCI combustion values, indicated by decision block 32, the rich combustion target values are maintained until a command is received, at block 34, to end the PCCI rich combustion mode and return to the previous lean combustion mode. If the fuel mass flow, injection timing and A/F ratio values are not at the target value, fuel continues to be proportionally decreased and injection timing proportionally advanced to their target values until their respective target values are realized.

As graphically illustrated in FIG. 4, when a command at block 36 is received to end the rich PCCI combustion mode and transition back to the previous lean combustion mode, the intake air is abruptly increased to the initial lean combustion value as indicated by block 38, and the in-cylinder oxygen concentration is determined as represented at block 40. When intake air is abruptly increased, the progressive decrease in in-cylinder oxygen illustrated in FIG. 2 is reversed, i.e., there will be a progressive increase in in-cylinder oxygen concentration as the transition proceeds to the previous lean operation mode.

For transition from rich PCCI combustion back to lean combustion, fuel mass flow is abruptly reduced and injection timing is simultaneously abruptly advanced to their respective initial lean combustion values as indicated respectively at blocks 42 and 44. Fuel mass flow is then proportionally decreased as indicated at block 46, and simultaneously injection timing is retarded as indicated at block 48, to their respective normal lean combustion values. When the fuel mass flow, injection timing and A/F ratio values for lean combustion are reached, as indicated at decision block 50, transition control is ended as indicated at block 52.

If a rich low temperature combustion mode is selected at block 16, the initial rich LTC combustion values for intake air and fuel are determined at block 54. The intake air is abruptly reduced to a selected initial rich combustion value, represented at block 56, and in-cylinder $O_2$ concentration is determined as indicated at block 58. As described above, abruptly reducing intake air, for the purpose of rapidly reducing the in-cylinder oxygen concentration, can be provided by abruptly closing the intake throttle, abruptly reducing boost air from the turbocharger, and/or increasing exhaust gas recirculation rate, if used. The actual in-cylinder oxygen concentration is determined by one or more of the methods discussed above.

As illustrated above in FIG. 5, the mass of fuel injected is abruptly increased as indicated at block 60, to the determined initial rich LTC target fuel value based on the current in-cylinder oxygen concentration in the cylinder. Simultaneously with abruptly increasing injected fuel mass, the injection timing is also abruptly retarded to an initial rich LTC target value that will avoid an increase in torque resulting from the increase in injected fuel, as indicated at block 62. Fuel quantity is then reduced proportionally to maintain the target A/F ratio during the transition to the final target fuel quantity as indicated at block 64. Simultaneously with proportionally decreasing the fuel to the target A/F ratio, injection timing is proportionally advanced to the desired target timing value, as indicated at block 66.

When the current operating fuel mass flow, injection timing and A/F ratio values are at the desired LTC rich combustion values, indicated by decision block 68, the LTC rich combustion target values are maintained until a command is received, at block 70, to end the LTC rich combustion mode and return to the previous lean combustion mode. If the fuel mass flow, injection timing and A/F ratio values are not at the target value, fuel continues to be proportionally decreased and injection timing proportionally advanced to their target values until their respective target values are realized.

As graphically illustrated in FIG. 6, when a command at block 72 is received to end the LTC rich combustion mode and transition back to the previous lean combustion mode, the intake air is abruptly increased to the initial lean combustion value as indicated by block 74, and the in-cylinder oxygen concentration is determined as represented at block 76.

For transition from LTC rich combustion back to lean combustion, fuel mass flow is gradually reduced and injection timing is simultaneously gradually retarded to their respective initial lean combustion values as indicated respectively at blocks 78 and 80. Fuel mass flow is then proportionally decreased as indicated at block 82, and simultaneously injection timing is proportionally retarded as indicated at block 84, to their respective normal lean combustion values. When the fuel mass flow, injection timing and A/F ratio values for normal lean combustion are reached, as indicated at decision block 86, transition control is ended as indicated at block 88.

Thus, the engine control method embodying the present invention provides fast A/F ratio transition from lean to rich and/or rich to lean combustion modes by matching fuel quantity with the coexisting oxygen concentration in each cylinder to obtain the target A/F ratio from the moment the transition is initiated, while injection timing is modified accordingly to prevent engine torque fluctuation. Changes in injection timing are determined by the fuel quantity and the current A/F ratio. The higher the A/F ratio (the leaner the mixture), the more the injection timing is retarded. The present invention is particularly desirable for providing products of rich combustion in normally lean combustion engines. Heretofore, fast transition between combustion modes has typically caused engine torque fluctuation. The present invention maintains stable torque values during such transitions, and due to a shortened transient period between combustion modes, the fuel penalty generally associated with such transitions is reduced.

Although the present invention is described in terms of preferred illustrative embodiments, those skilled in the art will recognize that the actual abrupt reduction in intake air, and consequently $O_2$ concentration in a cylinder, will be largely dependent upon the physical configuration of a particular engine. The reduction in in-cylinder oxygen concentration will be affected by intake air pressure which may be increased by turbocharging, the amount of exhaust gas recirculated in engines equipped with EGR systems, the timing and duration of intake and exhaust valve openings and closings on engines equipped with variable valve actuation systems, and variable ambient parameters, such as barometric pressure, temperature and humidify. Also, it should be recognized that the present invention is equally applicable to both lean combustion standard Diesel engines as well as direct injected lean-burn spark ignition engines. The present invention is applicable to such engine configurations and combustion principles.

Other aspects, features and advantages of the present invention may be obtained from a study of this disclosure and the drawings, along with the appended claims.

The invention claimed is:

1. A method for controlling an engine to maintain stable torque during rapid air/fuel (A/F) ratio transitions between a normal lean combustion mode and a temporary rich combustion mode, said engine having a means for determining intake air mass flow, at least one combustion chamber, and a fuel injector in fluid communication with the combustion chamber, said method comprising:
   operating said engine in a normal lean combustion mode wherein the intake air and the quantity of injected fuel, and the timing of injected fuel have selected values;
   determining rich combustion initial values for intake air, fuel quantity and injection timing, said rich combustion initial fuel quantity and injection timing being sufficient to maintain engine torque stability for said rich combustion initial value of intake air;
   determining a target air/fuel ratio and injection timing for operation in a defined temporary rich combustion mode;
   abruptly reducing intake air mass flow to the determined rich combustion initial value;
   determining the concentration of oxygen in a selected cylinder;
   simultaneously abruptly increasing the quantity of fuel injected into said selected cylinder and abruptly retarding the timing of fuel injection into the cylinder, said quantity of fuel and said timing of fuel injection being their respective determined rich combustion initial values, and
   subsequently proportionally decreasing the quantity of fuel injected into said cylinder to maintain the target air/fuel ratio for a coexisting oxygen concentration in said cylinder during said transition from said lean combustion mode to said rich combustion mode while simultaneously proportionally advancing the timing of fuel injected into said cylinder to said determined target injection timing value.

2. The method for controlling an engine, as set forth in claim 1, wherein said transition is from a lean combustion mode to a rich premixed controlled compression ignition mode, and the target fuel injection timing for operation in said premixed controlled compression ignition mode is retarded from the fuel injection timing when the engine is operating in said lean combustion mode.

3. The method for controlling an engine, as set forth in claim 1, wherein said transition is from a lean combustion mode to a rich low temperature combustion mode and said target fuel injection timing for operation in said rich low temperature combustion mode is advanced from the fuel injection timing when the engine is operating in said lean combustion mode.

4. The method for controlling an engine, as set forth in claim 1, wherein said method, subsequent to the rapid A/F ratio transition from the normal lean combustion mode to the temporary rich combustion mode, includes:
   operating the engine in said rich combustion mode for a selected length of time;
   determining lean combustion initial values for intake air, fuel quantity and injection timing, said lean combustion fuel quantity and injection timing being sufficient to maintain engine torque stability for said lean combustion initial value of intake air;
   abruptly increasing intake air to said lean combustion initial value;
   determining the concentration of oxygen in said selected cylinder;
   decreasing the amount of fuel injected into said cylinder to said initial lean combustion initial value and simultaneously modifying the timing of fuel injected into said cylinder to said initial lean combustion value; and
   subsequently proportionally decreasing the amount of fuel injected into said cylinder and simultaneously proportionally retarding the timing of fuel injected into said cylinder to their respective lean combustion values.

5. The method for controlling an engine, as set forth in claim 4, wherein said transition is from a rich premixed controlled compression ignition combustion mode to a lean combustion mode, and said decreasing the amount of fuel and simultaneously modifying the timing of fuel injected into said selected cylinder includes abruptly decreasing the amount of fuel to said initial lean combustion value and said modifying the timing of fuel includes abruptly retarding the timing of fuel injected into said cylinder to said initial lean combustion value.

6. The method for controlling an engine, as set forth in claim 4, wherein said transition is from a rich low temperature combustion mode to a lean combustion mode, and said decreasing the amount of fuel and simultaneously modifying the timing of fuel injected into said selected cylinder includes gradually decreasing the amount of fuel to said initial lean combustion value and said modifying the timing of fuel includes gradually retarding the timing of fuel injected into said cylinder to said initial lean combustion value.

7. The method for controlling an engine, as set forth in claim 1, wherein said engine is a Diesel engine.

8. The method for controlling an engine, as set forth in claim 1, wherein said engine is a direct injected spark ignition engine operating in a normal lean burn combustion mode.

9. The method for controlling an engine, as set forth in claim 1, wherein said engine has at least one exhaust gas aftertreatment device, and said temporary rich combustion mode is for the purpose of regenerating the aftertreatment device.

10. The method for controlling an engine, as set forth in claim 1, wherein said engine has an exhaust gas recirculation system and said determining a target air/fuel ratio includes the air portion of the target air/fuel ratio being a mixture of ambient air and recirculated exhaust gas.

11. The method for controlling an engine, as set forth in claim 1, wherein said engine has an exhaust gas recirculation system and said determining a target air/fuel ratio includes the air portion of the target air/fuel ratio being recirculated exhaust gas.

12. The method for controlling an engine, as set forth in claim 1, wherein said engine has a variable valve actuation system and said abruptly reducing intake air mass flow to the determined rich combustion initial value includes abruptly at least partially closing an intake valve associated with said cylinder.

13. The method for controlling an engine, as set forth in claim 4, wherein said engine has a variable valve actuation system and said abruptly increasing intake air to said lean combustion initial value includes abruptly opening an intake valve associated with said cylinder to a position sufficient to provide a selected lean combustion intake air value.

* * * * *